(No Model.)
W. BALL.
GATE.
No. 402,501.  Patented Apr. 30, 1889.
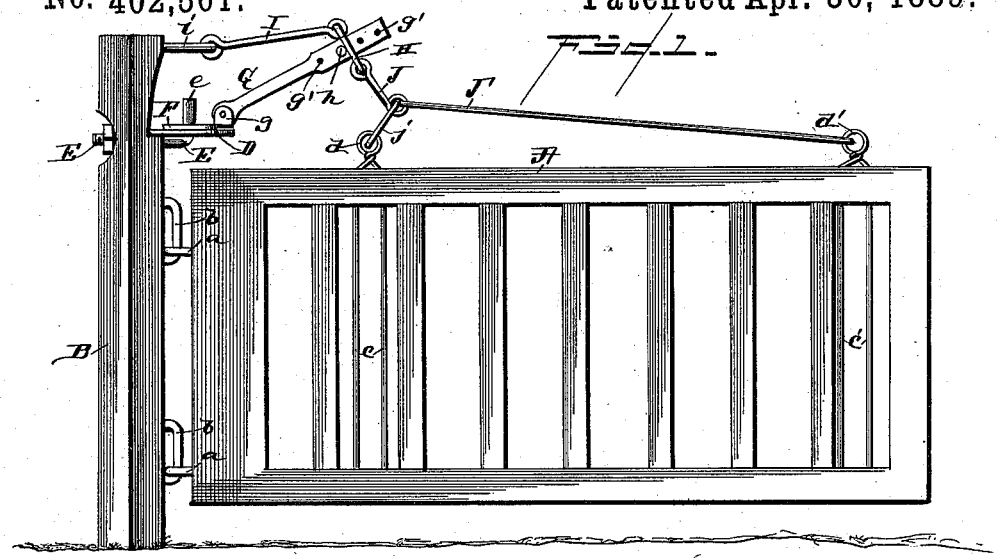
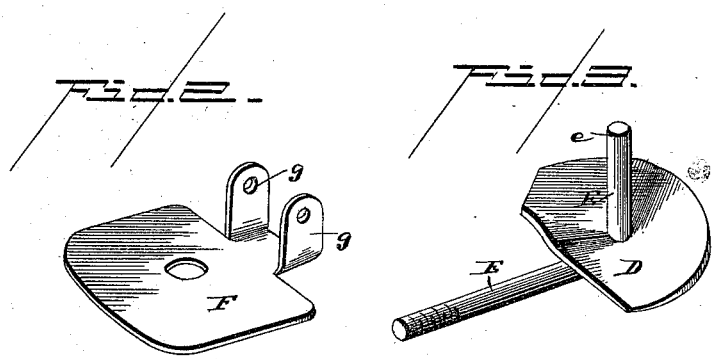
WITNESSES.
M. H. Pumphrey.
Van Buren Hillyard.
INVENTOR,
William Ball
By R. S. & A. P. Lacey
Attorneys

UNITED STATES PATENT OFFICE.

WILLIAM BALL, OF LYNCHBURG, OHIO.

GATE.

SPECIFICATION forming part of Letters Patent No. 402,501, dated April 30, 1889.

Application filed August 14, 1888. Serial No. 282,714. (No model.)

*To all whom it may concern:*

Be it known that I, WILLIAM BALL, a citizen of the United States, residing at Lynchburg, in the county of Highland and State of Ohio, have invented certain new and useful Improvements in Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to gates which swing in either direction and which close automatically.

The object of the invention is the provision of a gate that can be readily adjusted to any level within certain limits, and which will remain parallel to its normal position during its entire movement when opening and closing, the gate closing by gravity.

The improvement consists of the novel features which hereinafter will be more fully described and claimed, and shown in the annexed drawings, in which—

Figure 1 is a side view of a gate embodying my invention; Fig. 2, a perspective view of the turn-table, and Fig. 3 a perspective view of the plate or base that supports the turn-table.

The gate A, of ordinary construction, is hinged at one end to the support or gate-post B by the eyebolts $a\ a$ and the staples $b\ b$, the staples being sufficiently long to permit the vertical adjustment of the gate, and is braced by the vertical rods $c$ and $c'$, located near the ends of the gate, the upper ends of the rods being bent to form the eyes $d$ and $d'$. Above the gate is arranged the plate or base D, which is secured to the support or post B by the right-angled bolt E. The vertical extension $e$ of the bolt E is in axial line with the axis of the gate and forms a pivotal connection between the turn-table F and the base D. The arm G is pivotally connected with the turn-table, being pivoted between the ears $g$, and has connections between its outer end and the gate and the gate-post. The yoke H, mounted on the outer end of the arm G and adjustable on the said arm, being held by the pin $h$ passing through one of a series of openings, $g$, in the arm, is connected at one end with the gate-post by the link I and the eyebolt $i$ and at its other end with the gate by the rods J and J' and the link $j$. The lower end of the rod J is connected with the eye $d$, and the lower end of the rod J' is connected with the eye $d'$.

It will be observed that the arm G and its connections with the post B and the gate move with the gate, and that the hinge-connection between the fixed eyebolt $i$ and the link I is not in axial line with the axis of the gate and the arm G; hence when the gate is swung open from either side the distance between the eyebolt $i$ and the end of the arm G diminishes, and as a consequence the gate is caused to rise and the strain caused to come on the arm G and its connections. When the gate, after being opened is released, it is closed by the gravity of the gate, or, rather, by the strain incident to the rising of the gate, which strain is slightly to one side of the axis of the gate by reason of the pivotal connection between the link I and the eyebolt $i$ being out of axial line with the axis of the gate and the axis of the arm G.

The plate or support D is slightly elevated on one side of the extension $e$ to form a cam-surface, which assists in effecting a closing of the gate when open, as will be readily understood.

To raise the gate, draw out the pin $h$ and push the yoke H nearer the upper end of the swinging arm G, and insert the pin $h$ in another of the openings to hold the yoke in its new position. To lower the gate, the yoke is brought nearer the lower end of the arm G. It will be seen that these several adjustments vary the inclination of the arm, and consequently the height or level of the gate.

Having thus described my invention, what I claim, and desire to secure by Letters Patent, is—

1. The combination, with the gate-support, the gate hinged to the support, and the connection interposed between the gate and the said gate-support, of the swinging arm G, adjustably interposed between the said support and the said connection, whereby the height of the gate can be varied as desired, substantially as and for the purpose described.

2. The combination, with the gate-support, of the gate hinged to the said support, the plate D, the turn-table on the plate D, and the arm hinged to the turn-table and having connection with the gate and with the gate-support, substantially as described.

3. The combination, with the gate-support, the gate, and the hinged arm, of the yoke adjustable on the arm, the link I between one end of the yoke and the gate-support, and the rods J J' between the gate and the other end of the yoke, substantially as described.

4. The combination, with the gate-support and the gate, of the plate D, having a cam on a portion of its upper surface, the turn-table, the arm hinged to said turn-table, and a connection between the gate and the gate-support, said connection being fastened to the said arm, substantially as described.

In testimony whereof I affix my signature in presence of two witnesses.

WILLIAM BALL.

Witnesses:
ISMA FROTH,
GEORGE PFISTER.